July 17, 1956

A. F. SHIELDS 2,754,731

PARTITION ASSEMBLY MACHINE

Filed Aug. 24, 1950

INVENTOR
ALBERT F. SHIELDS

BY
Ostrolenk & Faber
ATTORNEYS

July 17, 1956

A. F. SHIELDS 2,754,731

PARTITION ASSEMBLY MACHINE

Filed Aug. 24, 1950

INVENTOR
ALBERT F. SHIELDS
BY
Ostrolenk & Faber
ATTORNEYS

July 17, 1956

A. F. SHIELDS

2,754,731

PARTITION ASSEMBLY MACHINE

Filed Aug. 24, 1950

INVENTOR
ALBERT F. SHIELDS

BY
Ostrolenk & Faber
ATTORNEYS

United States Patent Office 2,754,731
Patented July 17, 1956

2,754,731
PARTITION ASSEMBLY MACHINE

Albert F. Shields, Forest Hills, N. Y., assignor to S & S Corrugated Paper Machinery Co., Inc., Brooklyn, N. Y., a corporation of New York Application August 24, 1950, Serial No. 181,259

2 Claims. (Cl. 93—37)

My present invention relates to partition assembly machines and more particularly to a method and means of assembly whereby a plurality of parallel partitions are moved longitudinally past an assembly station at which successive transverse partitions are moved into engagement therewith to form a complete cellular arrangement.

Objects of my invention include the provision of novel partition feeding means both for the longitudinal partitions and the transverse partitions, novel adjustment means to adapt the machine for various sizes of partitions and numbers of cells and novel control means to obtain appropriate registry.

The foregoing and many other objects of my invention will become apparent in the following description and drawings in which.

Figure 1:
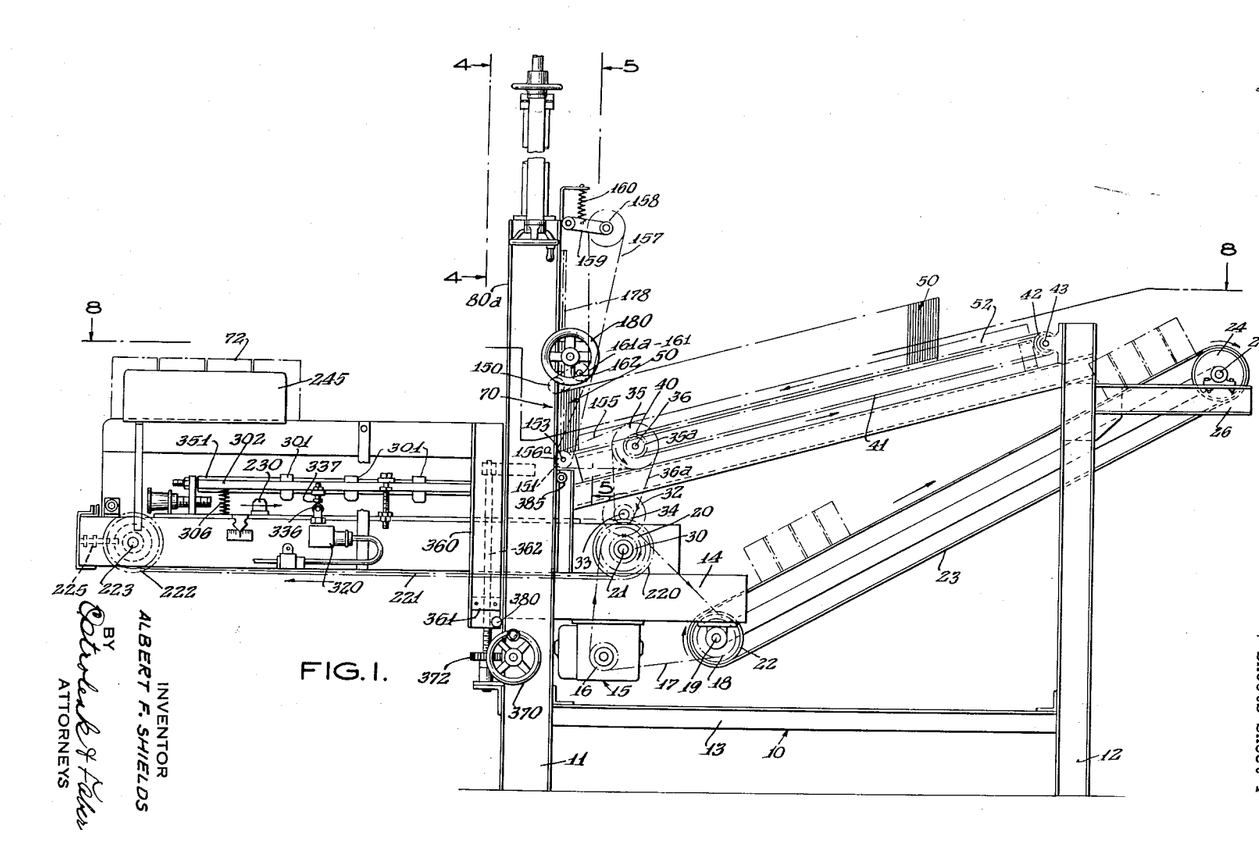
Figure 1 is a side elevation of my novel partition assembly.

Referring first to Figure 1, the frame 10 of the machine consists of a pair of front channel 11, a pair of rear channels 12 and bracing channels 13.

A subsidiary frame 14 is carried between the front channels 11 in a manner hereinafter described for vertical adjustment. The main drive motor 15 is mounted on the inside of frame 14.

Sprocket 16 on motor 15 drives chain 17 which in turn drives sprocket 18 on shaft 19 and sprocket 20 on shaft 21. The shaft 19 carries a belt drum 22 which drives the delivery belt 23, the opposite end of which is mounted on belt drum 24 on shaft 25 carried across the auxiliary frame members 26 supported in any suitable manner across the rear channels 12.

Shaft 19 for belt drum 22 is carried in appropriate bearings on the subsidiary adjustable frame 14. Gear 30 on shaft 21 drives gear 32 on shaft 33. Sprocket 34 on shaft 33 drives sprocket 35 on shaft 36. Shaft 36 also carries the pair of sprockets 40 which drive the pair of chains 41 in the direction indicated by the arrows of Figure 1, the opposite ends of the chains being supported on the idler sprockets 42 on cross shafts 43 carried in appropriate bearings across the rear frame channels 12.

Figures 7, 8, 9:
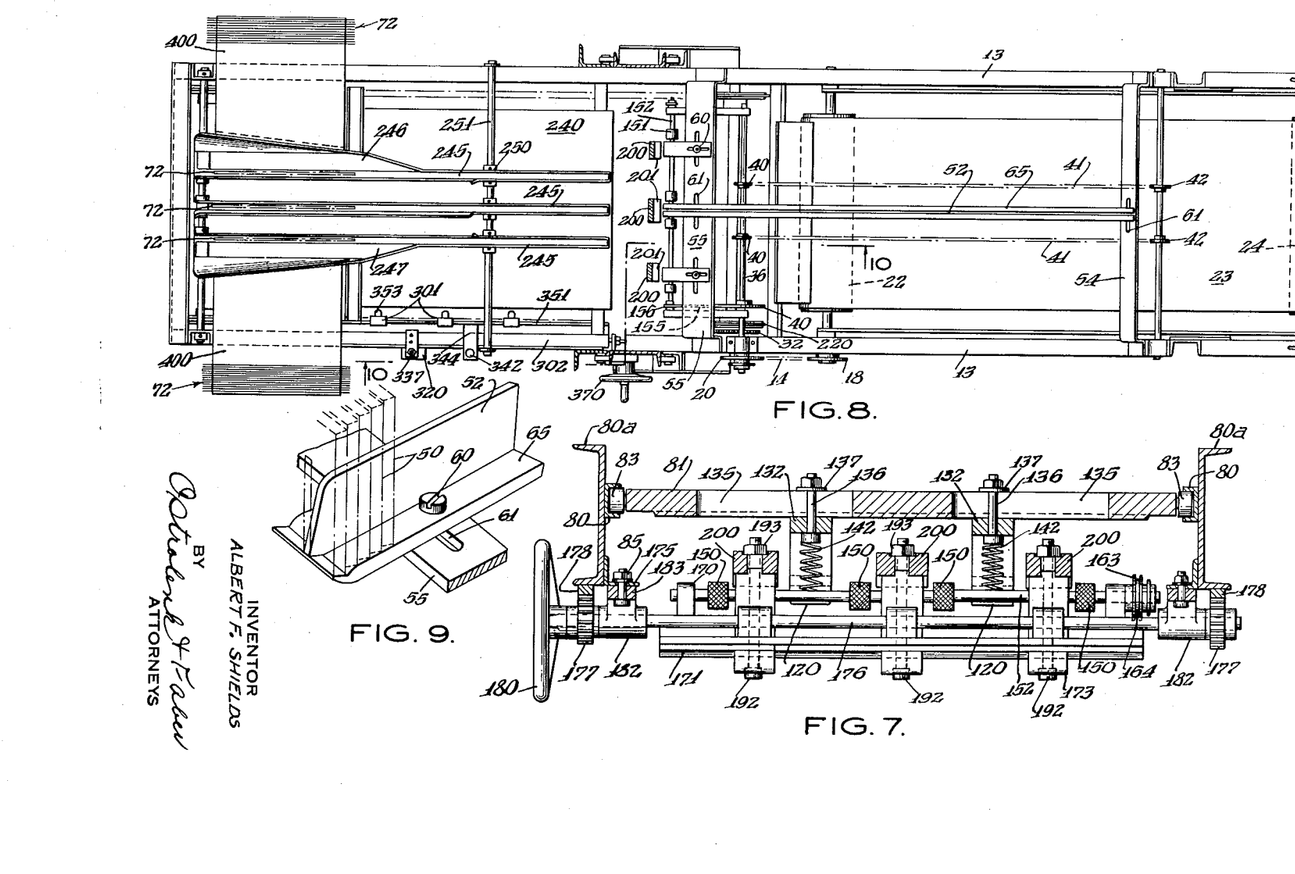
Figure 7 is a cross-section on line 7—7 of Figure 5 showing the operating slides and pushers.
Figure 8 is essentially a top view of the machine being taken on a section line 8—8 of Figure 1, however, which omits or runs below the cross partition feed.
Figure 9 is a detailed perspective view of the support track for the cross partition pieces.

The cross partition members 50 are mounted in linked aligned stacked arrangement across the chains 41. The partition blanks 50 are mounted with their slots facing downwardly. A guide rib 52 mounted at its upper end on the transverse bar 54 (Figure 8) and mounted on the transverse bar 55 at its lower end extends up above the upper level of the upper run of chains 41 to engage a slot of each of the partitions 50 and thereby hold them in appropriately aligned stacked arrangement as shown in Figures 1, 8, 9, and for delivery by the mechanism hereinafter described to the partition assembling head.

The rib 52 is fixed on bars 54 and 55 in the manner indicated in Figure 8 and more specifically shown in Figure 9 along the center line of the machine and is aligned with the fixed center guide slot 245 hereinafter described so that registry of all elements is obtained.

The arrangement of the feed device for the partition blanks 50 is such that they are positively fed by the chains 41 while at the same time the stack of blanks 50 may rapidly be added to at its trailing end to replenish a depleted stack without interfering at any time with the operation of the machine and without requiring any adjustments of the machine itself during the addition of additional blanks 50 to the stack.

Figure 2:
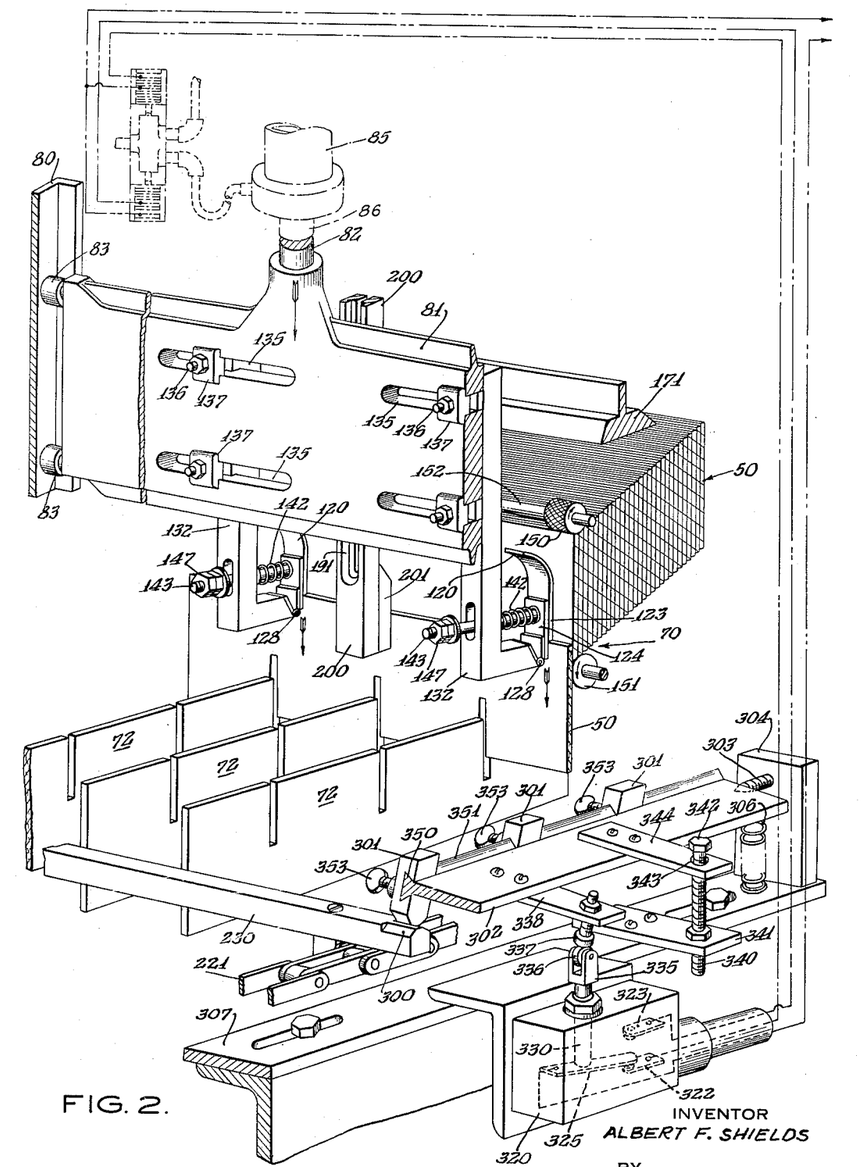
Figure 2 is a schematic perspective showing the general operation.
Figure 5:
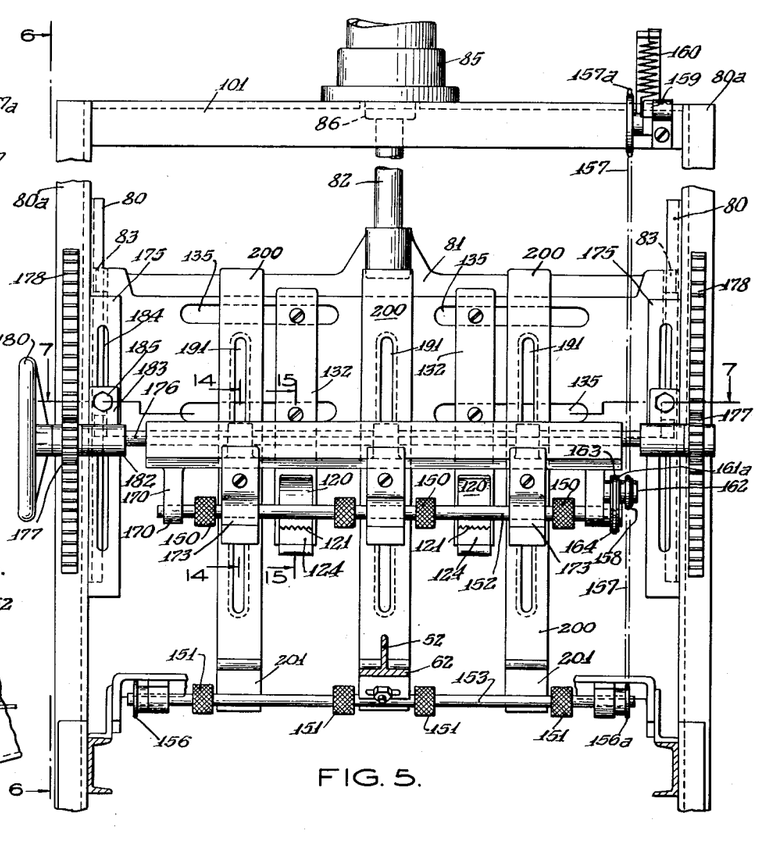
Figure 5 is a view from line 5—5 of Figure 1 showing the back end of the cross partition feed.
Figure 6:
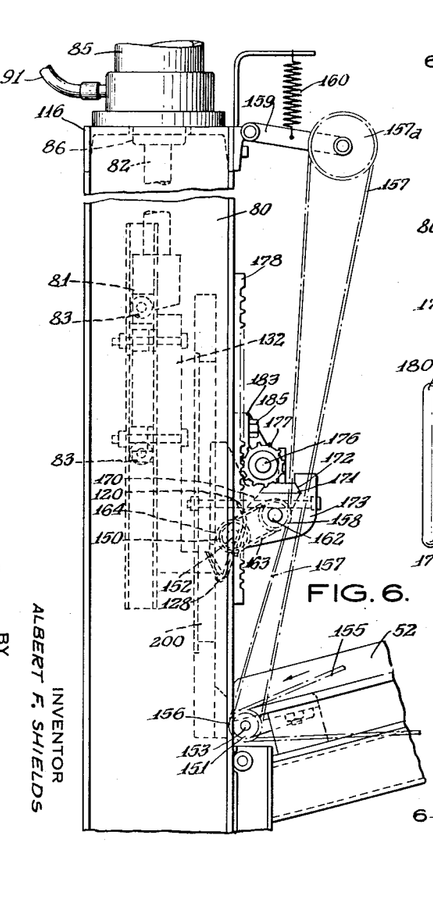
Figure 6 is a side view of the left side of Figure 5 on line 6—6 of Figure 5.

As the blanks are fed toward the assembly position indicated generally at 70 of Figures 1 and 2 and shown specifically in Figure 5, means must be provided to feed the blanks 50 downwardly in order to form the complete assembly.

As hereinafter described, a plurality of longitudinal blanks 72 forming partition walls are fed toward the feeding position 70, the blanks 72 being at right angles to the blanks 50 and moving in beneath the leading blank 50 at the left-hand side of the stack of Figure 1 as shown best in Figure 2.

Then the blanks 50 are thus fed downwardly into the blanks 72 which are transverse thereto as shown in Figure 2. The partition is assembled by successive feeding operations.

The method of timing the downward feed of blanks 50 in accordance with the longitudinal feed of blanks 72 will be hereinafter described.

At this point the description relates specifically to the elements of the downward feed of blanks 50 alone without specific reference to their timing with respect to the longitudinal feed of blanks 72. See also Figure 10.

Figures 3, 4, 16, 17:
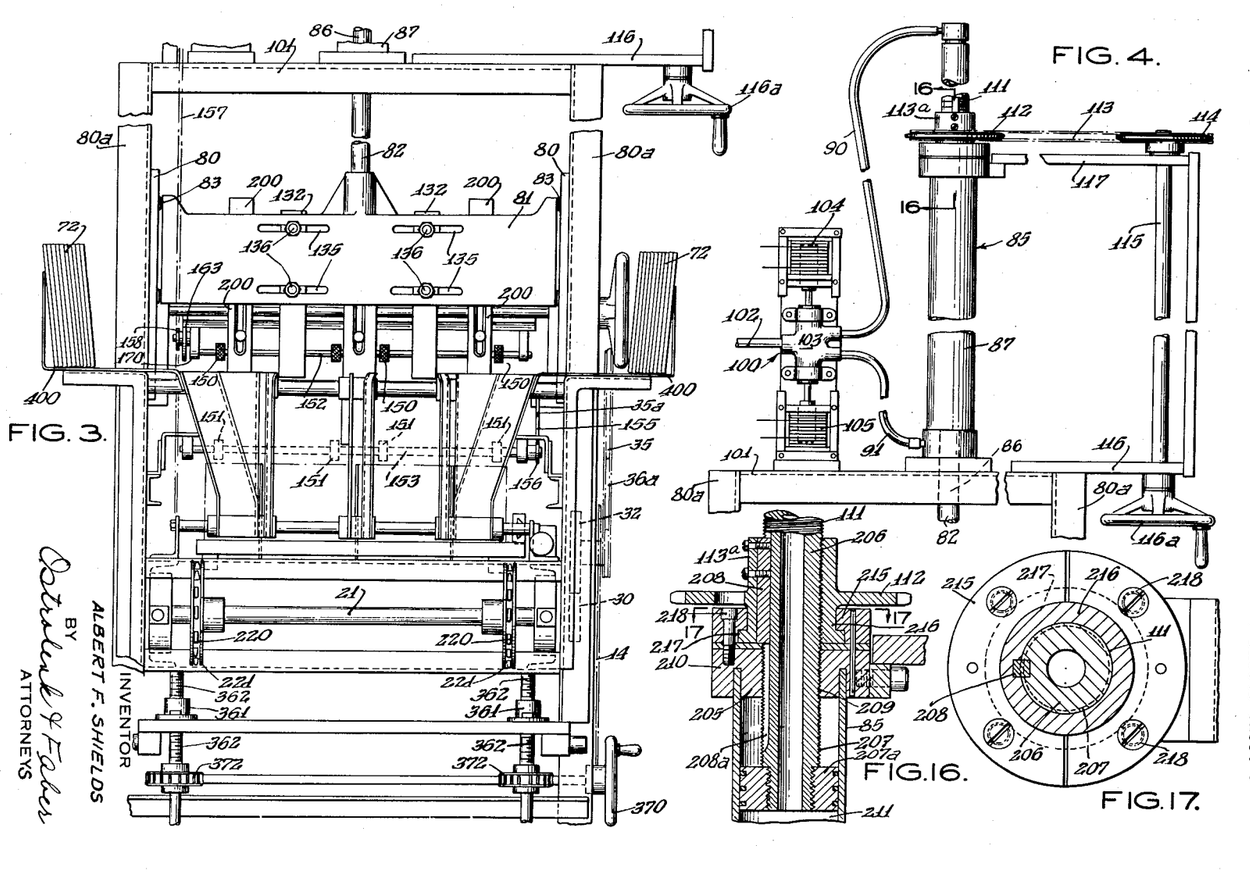
Figure 3 is a front view from the feeding end. The lower portion is not shown.
Figure 4 is a front view from line 4—4 of Figure 1 showing the pneumatic feed mechanism.
Figure 16 is a cross-sectional view taken on line 16—16 of Figure 4 showing the adjustment of the piston.
Figure 17 is a cross-sectional view taken on line 17—17 of Figure 16 looking in the direction of the arrows.

Channels 11 of the frame on each side are provided as shown in Figures 2 and 3 with the vertical channel extensions 80, 80 on each side serving as a guide for the feeding slide mechanism.

The feeding slide mechanism comprises the vertical feed plate 81 which is provided with lower and upper rollers 83 on each side riding in the channels 80. The feed member 81 is mounted on and keyed to the piston rod 82 of the pneumatic operator 85.

Piston rod 82 is essentially an extension of the piston 86 in the cylinder 87 of the pneumatic operating device 85.

When air is admitted to the upper portion of cylinder 87 through pipe 90, then the piston 86, the piston rod 82 and the feed slide 81 are driven down.

When air is admitted to the lower portion of cylinder 87 below the piston 86 through the pipe 91, then the piston 86, the piston rod 82 and the feed slide 81 are driven upwardly.

The lower position of the piston (and slide) is fixed. The stroke of the piston is varied by adjusting the upper position of the piston vertically. This is done by means of the screw 111 which has a plug 207a (Fig. 16) at its end as hereinafter described.

The solenoid operated control valve mechanism 100 is mounted on the cross bar 101 between the frame members 80 which in turn carry the feed mechanism 81.

The solenoid operated control valve has an intake pipe 102 connected to any source of compressed air or other fluid leading to the three-way valve 103. When solenoid coil 104 is energized, then the compressed fluid from pipe 102 is connected through three-way valve 103 to pipe 90 leading to the top of cylinder 87 and hence driving the piston 86 down.

At this time the pipe 91 is connected to an appropriate exhaust opening. When solenoid 104 is de-energized and solenoid 105 is energized, the valve has operated to the opposite position where compressed fluid pipe 102 is connected to the pipe 91 leading to the bottom of cylinder 87 and hence driving the piston 86 up. Pipe 90 is then connected to an appropriate exhaust opening in three-way valve 103.

By this means, therefore, the piston 86 and hence the feed member 81 may alternatively be driven down and up in accordance with the energization of solenoid coils 104 and 105. In ordinary operation solenoid coil 105 is normally energized so that the feed slide 81 is normally held in the up position.

When the movement of the longitudinal partition 72 as hereinafter described brings these partitions so that the slots thereof register with the slots of the cross partitions 50, then solenoid 105 is de-energized and solenoid 104 is energized to move down the feed slide 81 and hence move down the partition 50. This will hereinafter be described.

The stroke of piston 86 is adjusted by adjusting the effective height of the cylinder 87. For this purpose the cylinder 87 has a movable cap or plug 207a which is connected to the screw 111. Sprocket 112 is mounted on nut 113 which is free to rotate but is held axially at the upper outer end of the pneumatic apparatus 85.

Consequently, when sprocket 112 is rotated, the screw 111 and the sliding plug 207a forming the top of cylinder 87 are moved up and down. Sprocket 112 is driven by chain 113 from sprocket 114 on shaft 115 rotatably carried between the support bars 116 and 117 and rotatable for the adjustment above-described by the handle 116a.

Figure 10:
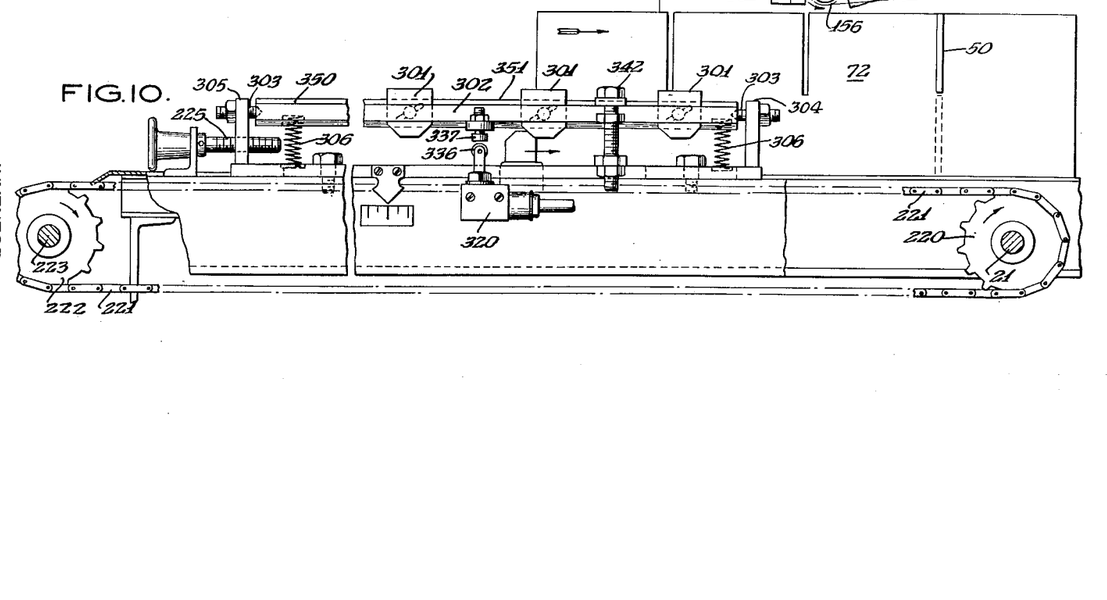
Figure 10 is a side view partly in cross-section taken on line 10—10 of Figure 8 showing the electrical control elements.
Figure 11:
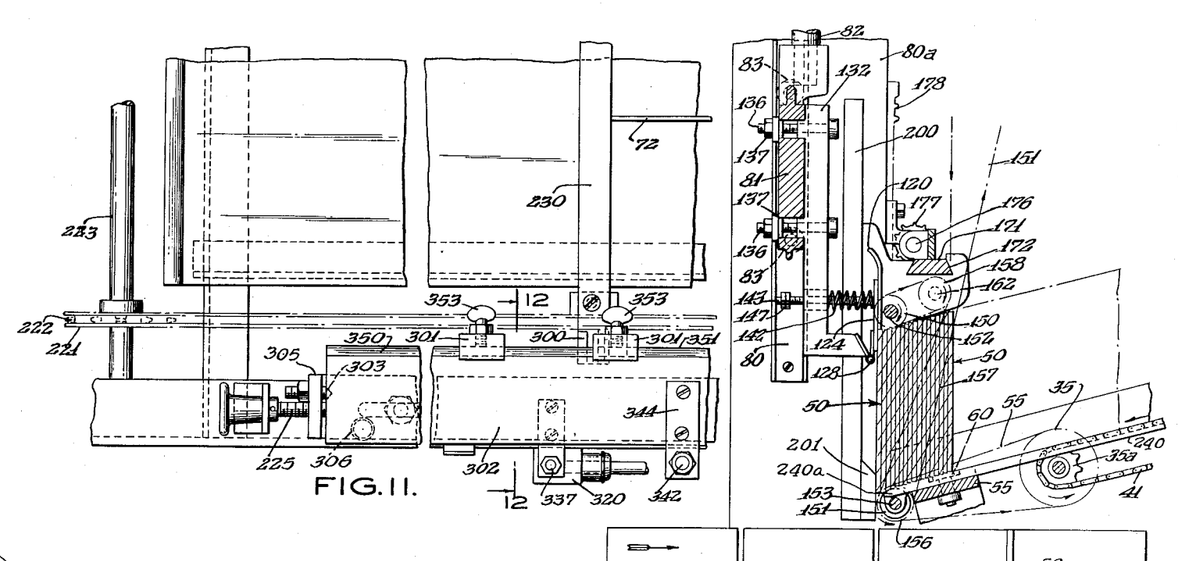
Figure 11 is a top view of the construction of Figure 10.
Figure 12:
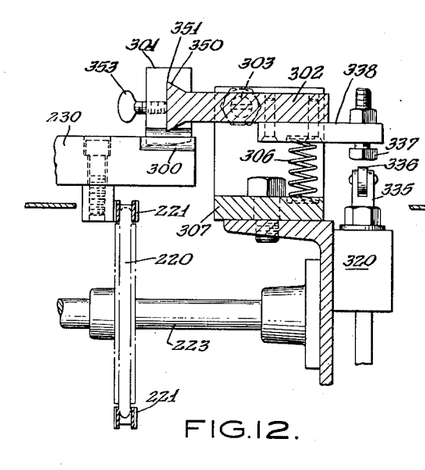
Figures 12 and 13 are based on Figure 11 on plane 12—12 thereof showing the operation of the switch by the cross bar.
Figure 13:
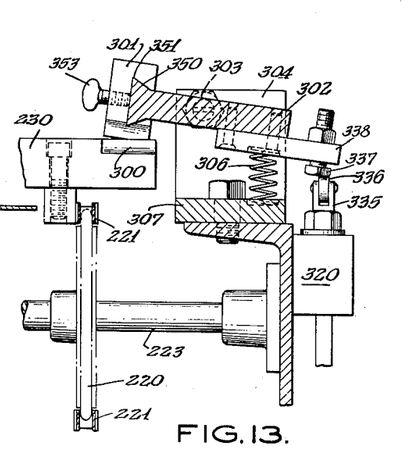

The slide 81 is provided with a number of pushing slats 120, 120 (see Figures 2, 5 and 10). Any appropriate number of pushing slats may be used, two being shown in the present embodiment. The pushing slats are provided at their lower ends with a serrated edge 121 adapted to readily engage the upper edge of the blank 50 at the lower end of the stack of blanks 50.

The pusher slats 120 are secured in any suitable manner as by the screws or rivets 123 (see Figure 15) to the backing plate 124. Thus, the serrated edge 121 of the pusher slat 120 forms a downwardly directed horizontal ledge against the backing plate 124. This downwardly directed horizontal edge has a thickness which is slightly less than the thickness of any of the blanks 50 so that when the slide 81 moves down, the serrated edge 121 will engage only the lowest or leftmost blank 50 in the stack of blanks 50.

Figures 14, 15:
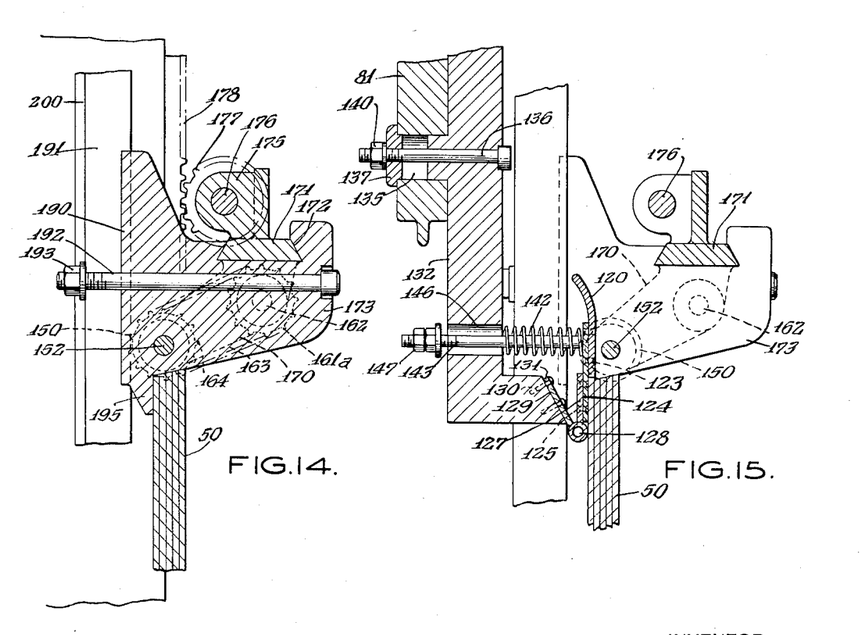
Figure 14 is taken from on plane 14—14 of Figure 5 showing the vertical initial adjustment of the slide for different heights of partitions.
Figure 15 is a taken on plane 15—15 of Figure 5 and shows the feed slats attached to the slide.

Backing plate 124 is secured in any suitable manner as by rivets or screws 125 to the hinged plate 127 which in turn is pivotally secured on the hinged pin 128 to which the other leaf 129 of the hinge is secured.

Leaf 129 of the unit is secured in any suitable manner as by bolts or rivets 130 to the inclined surface 131 of the supporting bracket 132.

Supporting bracket 132 is secured to the feed slide 81 so that it at all times moves vertical therewith. The said supporting bracket 132, may, however, be laterally adjusted for variation in the width of different runs of blanks 50. This adjustment is provided by the clamp type securement through the slots 135 in the feed slide 81. This clamp type securement comprises a long bolt 136 passing through an appropriate opening in the bracket 132 and through the slot 135 where it is engaged by a flange clamping member 137 held in place by the washer and lock nut assembly 140.

Loosening of the washer and lock nut assembly 140 for each of the points of securement of the bracket 132 will permit lateral adjustment of the bracket 132 and hence of the feed slat 120.

The feed slat 120 is biased toward appropriate feeding arrangement by the compression spring 142 guided by the rod 143 carried by the backing plate 124 for the feed slat 120. The compression spring 142 is captured between the backing plate 124 and the front face of the support bracket 132.

The rod 143 passes through the slot 146 in the support bracket 132 and the nut and lock nut assembly 147 on the end of rod 143 ensures that the compression spring 142 will have an appropriate stop when there are no blanks 50 in the machine the nut and lock nut assembly 47 at that time pushing against the left side of bracket 132 with respect to Figure 15.

The compression spring 142 ensures that the feed slat and especially the backing plate will be driven into firm feeding engagement with the front or lower board 50 of the stack of blanks 50 so that the edge 121 will be in feeding engagement with the top edge of the lowest blank 50.

Consequently, as slide 81 is moved up and down successively, the chains 41 as hereinafter described drive the boards 50 toward engagement with the backing plates 124 so that they may be engaged by the lower edge 121 of feed slat 120 while at the same time the compression spring 142 drives all of the backing plates 124 of the feed slats 120 toward the partition blanks so that appropriate engagement always occurs.

It is, therefore, essential that irrespective of the height of the pile of partition blanks 50 that the partition blanks 50 be driven firmly against the backing plate 124 for the feed assembly.

For this purpose, I provide the top and bottom knurled feed rollers 150 and 151, respectively, mounted on shafts 152 and 153. The lower feed rollers rotate in a counterclockwise direction with respect to Figures 1 and 10. The upper feed rollers 150 rotate in a clockwise direction with respect to Figures 1, 2, 10, 14, 15, and 6.

The shaft 36 carries an additional sprocket 25a (Figure 1) which through chain 155 drives the sprocket 156 on shaft 153, thereby driving the knurled rollers 151 in the proper direction for feeding the lower ends of blanks 50 toward the left.

Sprocket 156a on the other end of shaft 153 drives chain 157 which passes over the sprocket 157a carried on the tensioned adjustment bracket 159 which is held in appropriate tension by the tension spring 160.

Chain 157 drives sprocket 161 on shaft 162. Sprocket 161a on shaft 162 through chain 163 drives sprocket 164 on shaft 152 to drive the upper knurled rollers 150 in the appropriate direction for feeding the top edges of blanks 50 toward the feeding position.

Shaft 152 (see Figure 14) and its associated sprockets are carried in appropriate bearings in downwardly directed lugs 170 of the slide member 171 which in turn is carried in the beveled slot 172 of the auxiliary brackets 173.

The auxiliary brackets 173 are laterally adjustable on the slide member 171 which itself is stationary for at least laterally adjusting partitions.

Shaft 176 is carried by slide 171; shaft 176 has pinions 177 on opposite ends, the pinions 177 registering with the stationary racks 178 on the side frame members 80. Shaft 176 also supports guides 175 which slide inside frame member 80.

Shaft 176 (see Figure 5) is provided with the hand wheel 180 to rotate the same and thereby obtain a vertical adjustment of the auxiliary brackets 173, thereby raising or lowering the knurled rollers 150 in accordance with the height of the blanks 50 to be fed. Additional bearing members 182 integral with and on each side of slide 171 are secured to the slide member 183 on each side which slides with respect to the stationary slotted member 184 so that a clamping nut 185 may maintain the vertical adjustment.

Each bracket 173 (see Figure 14) is provided with an extension 190 entering into the slot 191 on the guide bracket 200. A bolt 192 and clamping nut 193 pass from the front of each auxiliary bracket 173 through the slot 191 into the guide bracket 200 to support guide bracket 200 in appropriate lateral position adjusted for the purpose hereinafter pointed out. Brackets 200 are held in fixed vertical position by guides at their upper ends.

The lower end of each guide bracket 200 is provided with a guide surface 201 defining the area or specific line on which the blank 50 on the left-hand end of the stack is to be fed down for appropriate registry.

The knurled rollers 150 and 151 rotate constantly in such a direction as to cause the leading blank 50 to be impressed at all times against the surfaces 201 so that it is in position to be driven downward by the edges 121.

Thus, appropriate registry may be obtained with the longitudinal partition 72 provided the movement of the longitudinal partition 72 is appropriately timed with respect to the downward movement of the feed slide 81 as hereinafter described.

The upper edge of the leading portion of the leading blank in the stack of blanks 50 is pressed against the extending portions 195 of the brackets 173. This positions the blank 50 in the horizontal direction. The undersides of brackets 173 limit blank 50 in the vertical direction. The leading edge 240a of bed plate 240 is arranged to limit blank 50 in the downward direction and are set sufficiently far from surfaces 201 to allow only one blank 50 to be kicked through at one time.

Vertical adjustments may be made by the loosening of clamping nuts 193 and 85 in appropriate vertical slots of the guide brackets 200 and 184 and by rotating hand wheel 180.

The shaft 21 (see Figure 1) driven by chain 17 also carries the sprockets 220 which drive the pair of chains 41 around the idling sprockets 222 on shaft 223. Shaft 223 is provided with appropriate adjusting means indicated generally at 225 to maintain appropriate tension on the chains 221.

A feed slat 230 (see Figure 1) is mounted across the chains 221. In the embodiment shown, only one feed slat 230 is provided, although where short partition blanks are used or where a larger machine is used more than one feed slat 230 may be used appropriately spaced from each other.

The feeding slat 230 is so arranged that it will push the longitudinal blank sections 72 of the partition toward the assembly area 70. For this purpose the bed plate 240 (Figure 8) is mounted between the chains 221 arranged, however, in such manner that the feed slat 230 will always move across the upper surface of the bed plate 240.

A plurality of guide slots on partition plates 245, 245 are mounted in vertical relation. Each pair of partition plates 245 is so spaced that it will loosely position in a vertical manner the longitudinal partition blanks 72. Each pair of partition plates 245 is secured to collars 250 slidably mounted for lateral adjustment on the cross bars 251 and securable in the adjusted position by any appropriate set screws or lock nut arrangements.

One or both of each of the pairs of plates 245 may be extended and flared as indicated at 246, 247 to facilitate the insertion by the operator of the longitudinal blanks 72 therebetween.

When in the embodiment shown three blanks 72 are inserted by the operator, the operator must do so before the feed slat 230 moves around to feeding position. As a practical matter, the operator as soon as the feed slat has removed a set of blanks from the guide 245 inserts another set of blanks therein to await engagement by the next feed slat.

The feed slat 230 picks up the trailing edge of the blanks 72 and pushes the blanks 72 toward the feeding position 70. It will here be noted that the slots of blanks 50 are downwardly directed and the slots of blanks 72 are upwardly directed.

The remainder of the operation is most clearly shown in Figure 2.

The feed slat 230 is provided with a beveled extension 300 which will engage the adjustable switch operators 301, 301 on the switch operating plate 302. Switch operating plate 302 is rotatably carried in appropriate bearings 303 in opposite plates 304, 305. A pair of compression springs 306 carried between a base plate 307 and the side of the switch operating plate 302 opposite that which mounts the members 301 drives the switch operating plate to the normally de-energized position, that is, it drives the switch operating plate 302 to the position of 302 wherein solenoid coil 105 is energized and solenoid coil 104 is de-energized.

The switch 320 is provided with a pair of stationary contacts 322 and 323, contact 322 being connected to energized coil 104 of the solenoid operated valve 100 and contact 323 being connected to energized coil 105 thereof.

The movable contact 325 is biased upwardly toward the contact 323 by spring 330. The external switch operator 335 connected to the contact 325 is provided with a roller 336 engageable by the adjustable stud 337 mounted on extension 338 of the switch operating plate 302.

A stop means is provided to prevent excess oscillation of the switch operation plate 302 in a counterclockwise direction with respect to Figure 2. The stop means comprises an adjustable bolt 340 secured in extension 341 of base plate 307, the head of which 342 extending through opening 343 in extension 344 of switch operating plate 302 serves as a stop therefor against the action of springs 306.

In the position shown in Figure 2, switch plate 302 has been operated to energize coil 104 and bring down the slide 81 and the feed slats 120. This has occurred because extension 300 of the feed slat 230 is engaged on operator 301 on the switch operating plate 302.

The operator 301 is provided with the beveled channel 350 slidably mounted on the slide section 351 of trapezoidal cross-section of the switch plate 302 and held in position by the clamping bolt 353 (dove tail slide).

The first operator 301 engaged by the extension 300 of feed slat 230 is positioned so that the switch 320 will be operated to operate the pneumatic feed mechanism 85 at the time the first slot of the blank 72 moves into the feed area 70.

At this time, therefore, the first blank 50 will be fed down across the first set of slots. Since the boards 72 each have three slots, it is necessary to have three blanks successively therein, and the second and third switch operators 301 are spaced in accordance with the spacing of the three slots in the longitudinal sections 72 of the partition, that is, as the feed slot moves the partion element 72 toward the assembly area 70, the first operator 301 is operated by extension 300 of feed slat when the first set of slots is in the assembly area.

The second operator is operated when the second set of slots is in the assembly area, and third operator is operated when the third set of slots is in the assembly area.

Accordingly, the operators may be added or removed in accordance with the number of slots in each of the longitudinal sections 72 of the partition and may be spaced in accordance with the distance therebetween.

Since adjustments may be made for the height of blanks 50, it is also necessary to adjust for the height of blanks 72. This adjustment is obtained by raising and lowering the subsidiary frame 14 which carries the motor and the chains 221. This adjustment is obtained by securing to the frame vertical frame members 360 in which are mounted any appropriate nuts 361 engaging the longitudinal screw 362 on each side.

A hand wheel 370 on side frame member 11 rotates through a worm, not shown, and a worm gear 372. The screw 362 as it rotates in the nuts 361 raises and lowers the platform or table 14 and whole assembly for feeding the longitudinal blanks 72. The frame member 360 is provided with rollers 380 abutting against the left side of channel member 11 on each side and with rollers 385 abutting against the right side of channel member 11 on each side to support the table member 14 and its associated elements in horizontal position.

Appropriate support platforms or tables 400 may be provided on each side of the feed-in section for the blanks 72 to provide receptacles for a set of blanks 72 which may be inserted by the operator in the guides 245.

As the partitions are assembled in the manner herein described, the feed slat 230 moves them from the bed plate 240 onto the delivery belt 23.

The stroke of the feed element is obtained by adjustment of the stroke of the piston therefor as shown in Figures 16 and 17. This permits adjustment for high or low blanks for tall or short partitions.

The rotation of wheel 116a rotates the sprocket 114, the chain 113 and the sprocket 112 having the head 113a secured by screws 200 to the key 208.

The stroke of the piston is determined by the adjustment of the height of the piston attained by moving the cylinder head 207a vertically. This vertical adjustment is obtained by the rotation of sprocket 112 turning the key 208 with the keyway 208a of the vertical support 206 of the cylinder head 207a.

As sprocket 112 rotates and key 208 thereby rotates the screw 216 which carries the cylinder head 207a, the screw 206 and the cylinder head 207a move vertically owing to the threaded engagement between threads 207 of the support 111 and thread 209 of the top closure member or head 210 of the cylinder 211.

Thus, by rotating the wheel 116a the rotation of sprocket 112 causes the rotation of support 216 and the adjustable cylinder head 207a and threaded engagement of the support 216 with the threaded extension of the stationary head 210 of the cylinder 211 permits the vertical adjustment to occur.

The sprocket is slidably mounted with respect to the support screw 206 of the cylinder head 207a and is operated so that appropriate chain connections can be made. The keyway makes possible an adjustment in both directions. Sprocket 112 is retained against vertical movement by the annular ledge 215 engaging in the annular recess 216 of sprocket 112.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In a partition assembly machine of the type having means for moving one set of parallel panels longitudinally toward an assembly point; means for moving a second set of panels in a direction normal to the planes thereof toward the assembly point at a level above the first set of panels; said second set of panels extending transverse to the first set of panels; notches in the first set of panels directed upwardly and notches in the second set of panels directed downwardly; a reciprocating feed member and additional means engaged by the means for moving said first mentioned set of panels for energizing said reciprocating feed member to operate in registry with the notches in said first set of panels to move a second panel down to interengagement with the first set of panels; said reciprocating feed member comprising a plate parallel to and slidable in a plane parallel to the second panel at the assembly point; a plurality of feed slats extending parallel to said plate and carried thereby; backing plates for said feed slats; means biasing said feed slats and backing plates toward said second panel, and aditional rotatable feed means at said assembly point engaging and feeding the second panel at the assembly point simultaneously with the operation of said first mentioned plate and feed slats.

2. In a partition assembly machine of the type having means for moving one set of parallel panels longitudinally toward an assembly point; means for moving a second set of panels in a direction normal to the planes thereof toward the assembly point at a level above the first set of panels; said second set of panels extending transverse to the first set of panels; notches in the first set of panels directed upwardly and notches in the second set of panels directed downwardly; a reciprocating feed member and additional means engaged by the means for moving said first mentioned set of panels for energizing said reciprocating feed member to operate in registry with the notches in said first set of panels to move a second panel down to interengagement with the first set of panels; said reciprocating feed member comprising a plate parallel to and slidable in a plane parallel to the second panel at the assembly point; a plurality of feed slats extending parallel to said plate and carried thereby; backing plates for said feed slats; means biasing said feed slats and backing plates toward said second panel, and additional rotatable feed means adjacent said plate engaging and feeding the second panel at the assembly point simultaneously with the operation of said first mentioned plate and feed slats.

References Cited in the file of this patent

UNITED STATES PATENTS

| Number | Name | Date |
|---|---|---|
| 1,154,237 | Dixon | Sept. 21, 1915 |
| 1,634,074 | Labombarde | June 28, 1927 |
| 1,691,919 | Carroll | Nov. 20, 1928 |
| 1,947,561 | Marcalus | Feb. 20, 1934 |
| 2,191,586 | Richard | Feb. 27, 1940 |
| 2,237,099 | Gillian et al. | Apr. 1, 1941 |
| 2,353,842 | McLaughlin et al. | July 18, 1944 |
| 2,381,743 | Harred | Aug. 7, 1945 |
| 2,398,872 | Ullsmith | Apr. 23, 1946 |
| 2,532,626 | Kleineberg | Dec. 5, 1950 |
| 2,594,924 | Hickin | Apr. 29, 1952 |